Patented Mar. 9, 1937

2,073,057

UNITED STATES PATENT OFFICE 2,073,057

WATER-SOLUBLE BACTERICIDALS

Paul Goedrich, Elizabeth, N. J.

No Drawing. Application April 6, 1933
Serial No. 664,772

13 Claims. (Cl. 167—31)

The object of the present invention relates, in general, to the production of new and improved water-soluble colloidal solutions, or highly dispersed solutions, and practically permanent aqueous suspensions of bactericidal compounds which are in themselves insoluble or but sparingly soluble in water. Such bactericides embrace numerous aromatic compounds, such as phenols, terpines, cresols, naphthalenes, and the like, and their derivatives. Especially efficient bactericides are halogen-substituted cresols and thymol, as chlor-cresol and chlor-thymol.

Since the appreciation of the high bactericidal value of chlor-thymol especially, much experimental work has been done in the art to discover satisfactory means for producing serviceable and stable solutions; but generally with indifferent success, especially with respect to aqueous solutions which will lend themselves to varied and general application in therapy and surgery, and even for cutaneous or intravenous injections.

I previously produced solutions of this kind which have proved eminently satisfactory, as described and covered by my copending application Serial No. 204,153. In the course of my work in developing such solutions, it was deemed promising to prepare solutions of the bactericides of the type under discussion by dissolving them in various sulphonated fatty oils, particularly in the more readily available Turkey-red oil of the market, and thus to produce a simple unit solution of such water-insoluble disinfectants without the addition of other compounds to effect solubility, or loading the composition with other substances which might be undesirable, even chemically incompatible, or medically contraindicated.

I found, however, that from solutions made with the usual and better grades of Turkey-red oil as found on the market, no satisfactory, stable, or clear aqueous solutions could be prepared. Even with such oils of the type of olive oil and castor oil, sulphonated by myself, no better results were obtainable. Further experimentation, however, led me to the discovery that I could produce much superior water-soluble solutions of this type by first dissolving these bactericidal aromatic compounds in the given oil with the aid of moderate heat, and then slowly sulphonating the cooled oil solution with concentrated sulphuric acid, as is substantially set forth in my copending application above mentioned.

I have now found that the relatively unsatisfactory results obtained from using ordinary Turkey-red oil as a solvent for disinfectants of the kind described, for instance cresol, thymol and their derivatives, appear to be ascribable to the content of albuminous matter in such oils, derived from the process of their production in expressing the oils from the castor beans, olives, corn, etc., and that by using an oil, respectively a sulphonated oil, which does not contain albumins, or which is relatively free from albuminous material, yields much better results.

Turkey-red oil neutralized with alkali is a colloid which has the property of bringing many water-insoluble substances into colloidal solution. When, however, the ordinary Turkey-red oil is dissolved in water, a more or less pronounced turbidity results, according to the dilution, and this appears to be in direct relation to the albumin content. It was found that with oils, entirely or nearly free from albumin, this untoward phenomenon does not occur.

It appears further that sulphonated oil, or its alkali salt, will act as a protective colloid for these albumins in aqueous solutions up to a certain dilution, but this action stops when such dilution is exceeded, and thereupon separation of the albumin is caused with resultant turbidity, the degree of which depends upon the quantity of albuminous matter present in the oil, respectively the sulphonated oil.

Now, since it is known that free alkali will work as a solvent for albumins, it were possible to over-alkalinize ordinary Turkey-red oil, even with an appreciable albuminous content, and thus avoid the precipitation and turbidity. Of course, the excess of alkali must be the greater the higher the albuminous content of the oil. But it is known that phenols, cresols, thymols and the like become in themselves less bactericidal in the form of alkali salts or in the presence of alkali, and this is increasingly manifest with the increase of alkilinity.

Turkey-red oil with but a comparatively small amount of alkali will, in a short time, precipitate a part of the albumin, in more or less dilute aqueous dilution, and more of it at reduced temperatures, as during the winter season. While, as stated, larger amounts of alkali would prevent such precipitation, over-alkalinization is also manifestly undesirable because of the reduced disinfectant power, and eventually also on account of untoward therapeutic effect.

In order to find a good, commercially and therapeutically serviceable product, I experimented with the production and employment of substantially albumin-free oil, and it was found that with such an albumin-free oil nearly ideal results were attainable in the application of the process of this application, as will further appear, and without resort to any undesirable over-alkalinization. Preferred methods of de-proteinizing the oils which have proved generally sufficient for the given purpose are by chilling to a low temperature, precipitating with the addition of fuller's earth and filtering, or by steam distillation.

The sulphonated oils of the type of Turkey-red oil made from expressed fatty oils have many technical uses, as to which the protein content is a matter of indifference, and hence no serious industrial effort has been made to prepare a substantially protein-free oil on a commercial scale.

But, while the oils may be very thoroughly de-proteinized in the laboratory, in industrial practice this cannot be so readily or effectively accomplished. Now it has also been found, however, that the disadvantage resulting from the presence of small residues of protein remaining after industrial de-proteinization may be avoided, and satisfactory aqueous dilutions of bactericidal solutions, prepared according to my process, may be obtained by the addition of certain corrective quantities of glycerin, glycol or similar polyhydric alcohols, as will presently appear. In view of the inherent industrial difficulty of producing an ideal protein-free oil, the process of the present application will be exemplified by its application under some varying conditions of use in a manner which will indicate its appropriate adaptation in accordance with such variations found in actual practice.

When working with a substantially albumin-free oil, the process may be exemplified, by way of illustration, as follows:

To make about 100 pounds of a clearly water-soluble chlorcresol solution in oil, thirty pounds of chlorcresol are dissolved at about 50° C. in about seventy pounds of neutral, or but slightly alkaline, Turkey-red oil substantially completely de-proteinized in acordance with the means above described, or by any other convenient or suitable process.

When, however, the oil is not as completely de-proteinized as required for the process illustrated in the foregoing example, the quantity of residual protein being nevertheless not excessive, the process may be modified, as previously indicated, for preparing a chlorthymol solution, as follows:

Ten pounds of chlorthymol are dissolved at about 40° C. in a Turkey-red oil of about pH 8, largely but not entirely de-proteinized, and then a sufficient quantity of a polyhydric alcohol, glycerin for instance, is added to maintain a clear solution.

The quantities of such alcohols required depend primarily upon the amount of residual protein remaining after perhaps more or less imperfect de-proteinization of the oil. The determination of the correct quantity of glycerin or other higher alcohols to be added according to the disclosed process can be ascertained by precise quantitative laboratory calculations, but because of the tediousness involved, a very satisfactory "blind" test may be made with a sample of the batch of oil to be put in process.

For this purpose, there is drawn a small test sample of the solution of the aromatic bactericide in the oil which has been "de-proteinized", but which is nevertheless known to contain some residual protein. To this is added a given measured quantity of glycerin. Thereupon about three parts of water are added to one part of the prepared test solution. This is then chilled to 0° C. for some hours and examined for clearness. If any pronounced turbidity is shown, this is an indication that a larger percentage of the alcohol must be added, with a few repeated tests in the same manner, and it will then be a mere matter of calculation to determine how much should be added to the entire manufacturing batch to insure a clear, stable aqueous solution of the desired dilution.

This corrective addition of glycerine and the like for the purpose of insuring clarity of solution is available only when the residual protein is comparatively small. It is undesirable to have to use excessive quantities of the correctant, which will obviously tend to reduce the relative bactericidal content, and may render the finished product increasingly unfit for all its contemplated applications.

Obviously, the several steps of the processes described may be modified considerably with respect to the required strength of solution, the physical characteristics of the given germicide, the de-proteinization of the oil, the range of temperature, etc., without departing from the scope and spirit of the invention. Thus, for instance, among other things, the de-proteinization process may be applied to the fatty oil before or after sulphonation, as may be most convenient under the conditions obtaining, the main objective being to have the finished product as free as possible from the disturbing protein content.

I claim:—

1. As new products, solutions of phenolic water-insoluble bactericidal compounds in substantially protein-free sulphonated fatty oils, having a honey-like consistency and color, and making clear aqueous solutions.

2. As new products, solutions of phenolic water-insoluble bactericidal compounds in substantially protein-free Turkey-red oil, having a honey-like consistency and color, and making clear aqueous solutions.

3. As a new product, a solution of chlorthymol in substantially protein-free sulphonated fatty oils, having a honey-like consistency and color, and making clear aqueous solutions.

4. As a new product, a solution of chlorcresol in substantially protein-free sulphonated fatty oils, having a honey-like consistency and color, and making clear aqueous solutions.

5. As new products, clearly water-soluble bactericidal solutions comprising a largely de-proteinized sulphonated oil, a phenolic compound possessing inherent bactericidal properties in solution in such sulphonated oil, and a polyhydric alcohol capable of dissolving the residual proteins remaining in the de-proteinized oil.

6. As a new product, a clearly water-soluble bactericidal solution comprising largely de-proteinized and neutral or slightly alkaline Turkey-red oil, chlorcresol dissolved therein, and glycol to dissolve the residual proteins remaining in the Turkey-red oil.

7. As a new product, a clearly water-soluble bactericidal solution comprising largely de-proteinized and neutral or slightly alkaline Turkey-red oil, chlorthymol dissolved therein, and glycerin to dissolve the residual proteins remaining in the Turkey-red oil.

8. The process of making clearly water-soluble solutions of phenolic compounds possessing inherent bactericidal properties, but in themselves insoluble, or but sparingly soluble, in water, comprising the steps of de-proteinizing a sulphonated fatty oil, and dissolving therein the phenolic bactericidal compound with the aid of heat.

9. The process of making clearly water-soluble solutions of chlorthymol, comprising the steps of de-proteinizing a sulphonated fatty oil, and dissolving therein the chlorthymol with the aid of heat.

10. The process of making clearly water-soluble solutions of phenolic compounds possessing inherent bactericidal properties, but in themselves insoluble, or but sparingly soluble, in water, comprising the steps of de-proteinizing a sulphonated fatty oil, and dissolving therein the phenolic bactericidal compound with the aid of heat, and adding a polyhydric alcohol in sufficient quantity to dissolve the residual amounts of protein remaining after de-proteinization of the oil.

11. The process of making clearly water-soluble solutions of chlorthymol, comprising the steps of de-proteinizing a sulphonated fatty oil, and dissolving therein the chlorthymol with the aid of heat, and adding glycerin in sufficient quantity to dissolve the residual amounts of protein remaining after de-proteinization of the oil.

12. The process of making clearly water-soluble solutions of chlorcresol, comprising the steps of de-proteinizing a sulphonated fatty oil, and dissolving therein the chlorcresol with the aid of heat, and adding glycol in sufficient quantity to dissolve the residual amounts of protein remaining after de-proteinization of the oil.

13. The process of making clearly water-soluble solutions of chlorcresol, comprising the steps of de-proteinizing a sulphonated fatty oil, and dissolving therein the chlorcresol with the aid of heat.

PAUL GOEDRICH.